Feb. 16, 1965    R. L. HOLLOWAY    3,169,597
DIFFERENTIAL DRIVE
Filed June 7, 1960    3 Sheets-Sheet 1
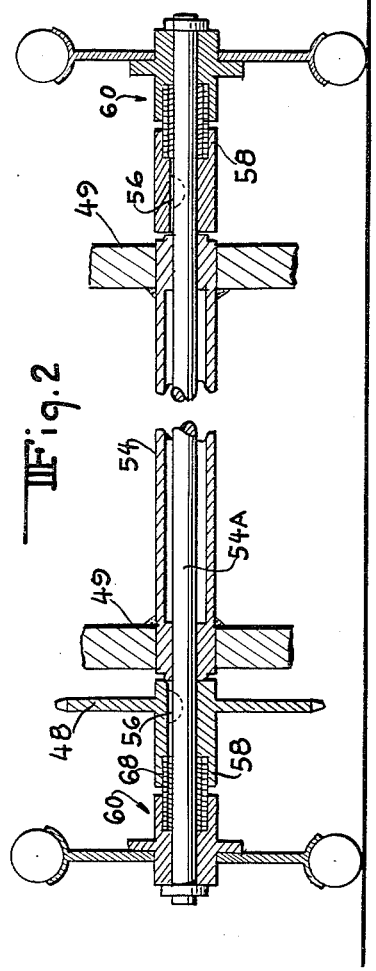
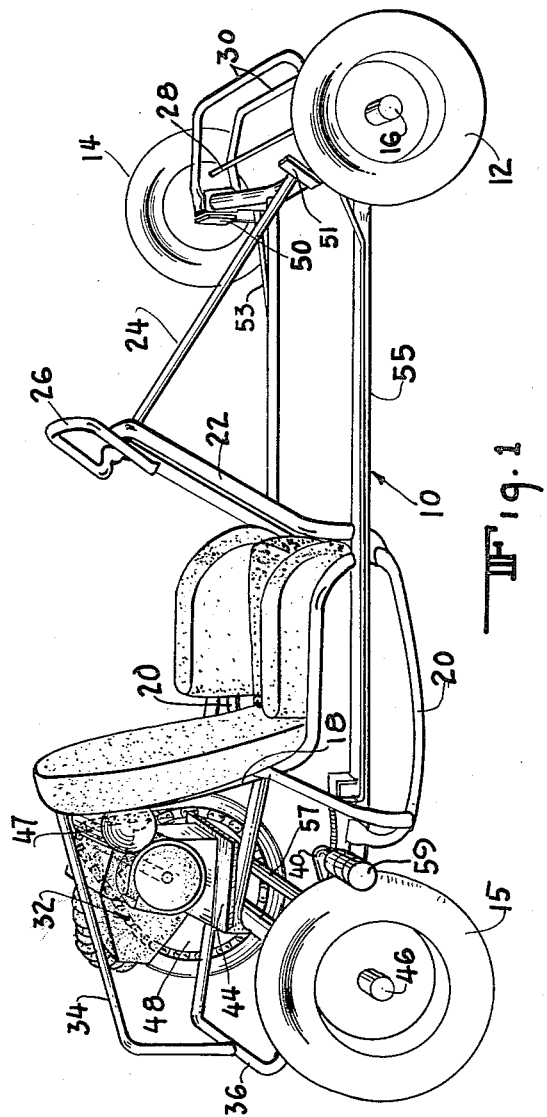
INVENTOR
ROBERT L. HOLLOWAY
BY
Tanner & Eastel
ATTORNEY

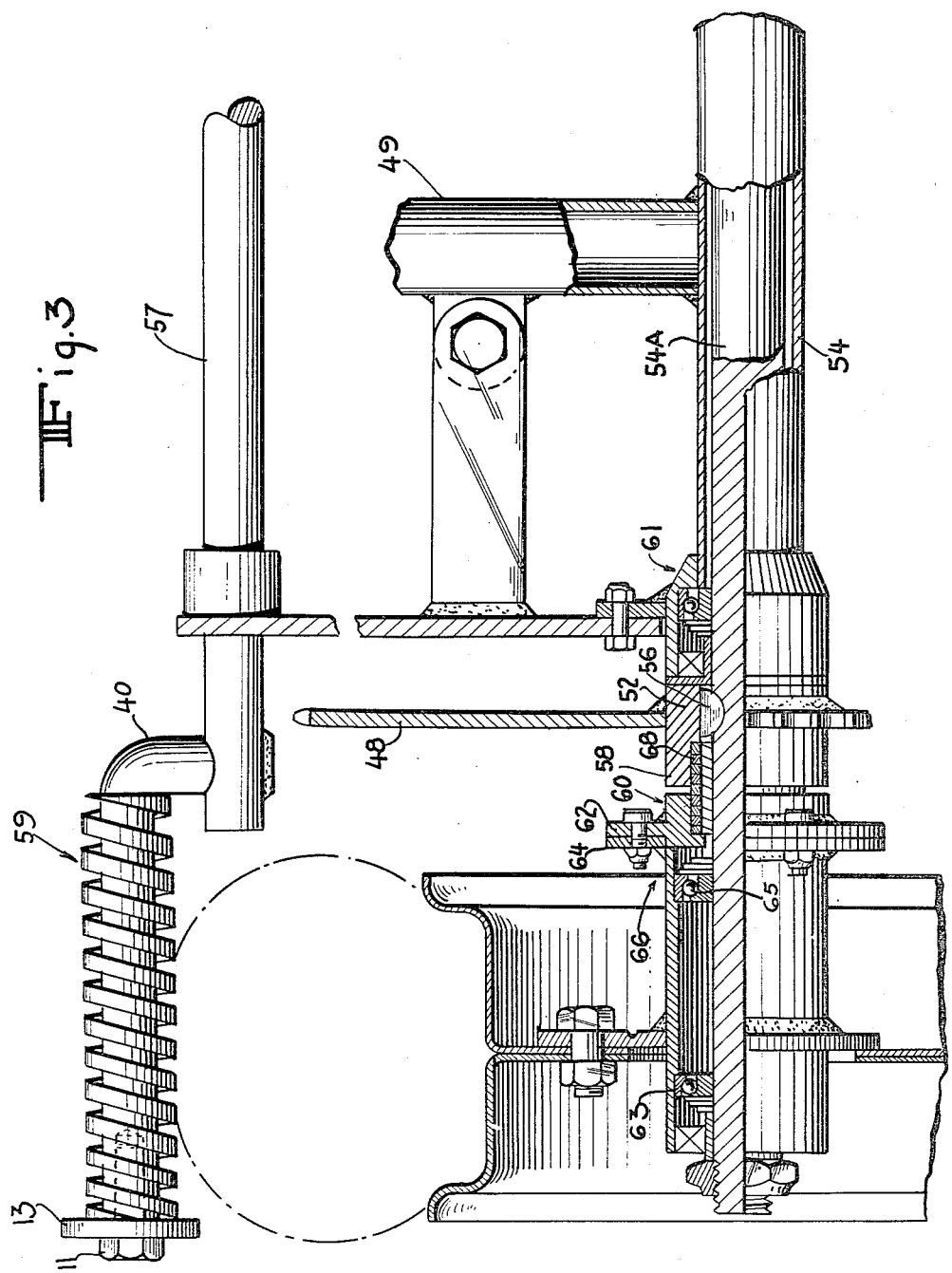

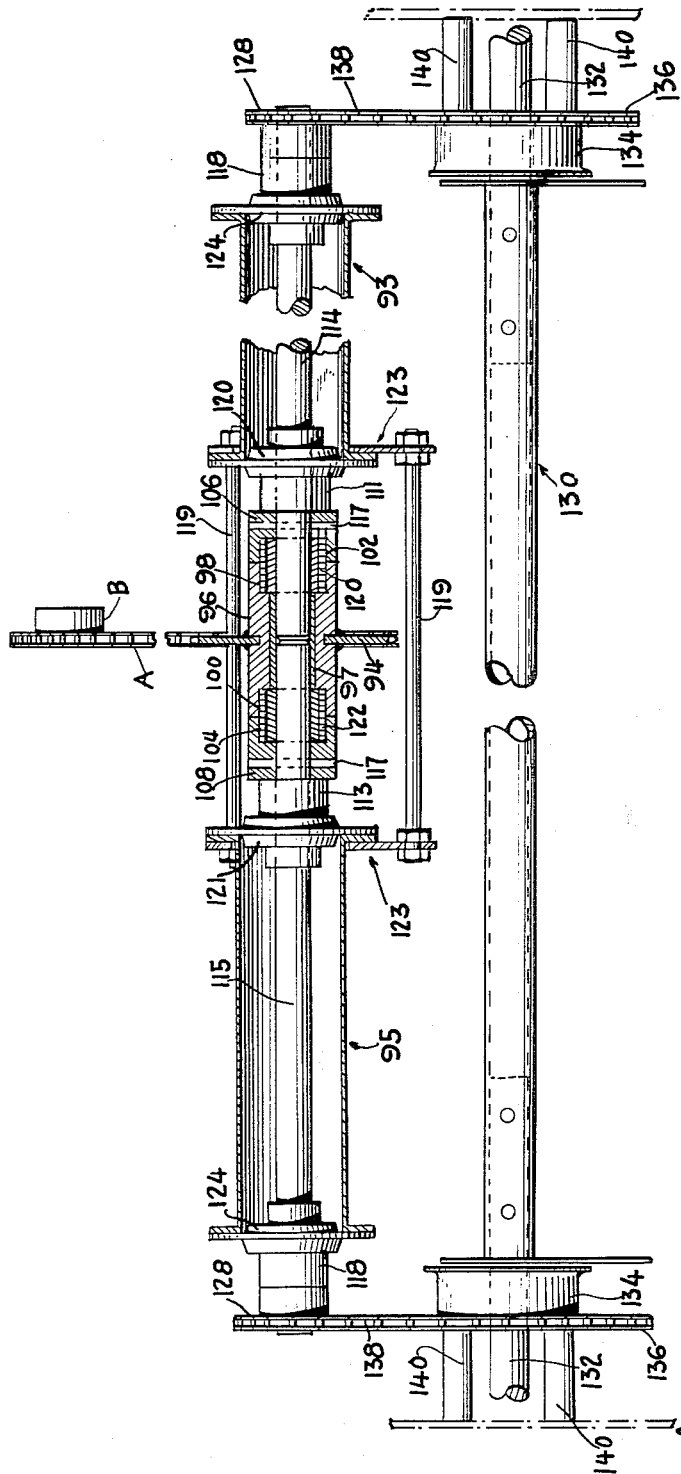

United States Patent Office 3,169,597
Patented Feb. 16, 1965

3,169,597
DIFFERENTIAL DRIVE
Robert L. Holloway, Snyder, N.Y., assignor to American Machine & Foundry Company, a corporation of New Jersey
Filed June 7, 1960, Ser. No. 34,506
1 Claim. (Cl. 180—76)

This invention relates generally to small automotive vehicles known as carts, and more popularly as "Go-Carts." More specifically, the invention relates to overrunning clutch drives and brakes for such vehicles.

Vehicles of this type generally have a rear wheel drive. In the past this drive has been of several kinds. In one, separate motors have driven each wheel. In another, only one wheel has been driven and in others both wheels have been driven by a live axle by one or more engines.

In going around curves, where the outside wheel must travel farther than the inside wheel while the cart is turning, it is important that means be provided to ensure that the outside wheel travels faster than the inside wheel, to avoid unnecessary drag on the vehicle. Common differential drives accomplish this as in automotive vehicles, but in such cases where one wheel spins, all traction is lost. While modern automobiles on the market today feature rear wheels anti spinning drives, they are complex and costly and would not be either feasible or practicable for the simple low cost "Go-Cart" field.

It is therefore an object of this invention to provide an improved racing cart having a one way cltuch drive for the rear wheels which has few components, is sturdy, easily assembled, reliable in operation and low in cost of manufacture.

A further object of the present invention is to provide a rear axle assembly having limited overrun clutches interposed between a driven shaft and the rear driving wheels of a vehicle.

Another object of this invention is to provide an improved self cleaning brake shoe, which is particularly well suited for use with "slick" or treadless racing tires and is readily replaceable for different types of tires.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

FIG. 1 is a perspective view of a "Go-Cart" which is adaptable for use with the present invention.

FIG. 2 is a sectional schematic arrangement of one embodiment of the drive system of the invention.

FIG. 3 is a fragmentary sectional view of one preferred design arrangement in accordance with the schematic of FIG. 2 and employing so called "scrubber" brakes.

FIG. 4 is a sectional view showing the drive of the invention embodiment in a jack shaft arrangement allowing a double speed reduction and a choice of brake arrangement.

Like reference characters identify like parts in the above views.

Broadly construed, the present invention consists in providing one way clutches between a drive sprocket and each drive wheel of a vehicle such as a "Go-Cart." Such clutches, unlike brakes, permit free movement in the reverse direction.

A vehicle on which the drive of the invention may be mounted is shown in FIGURE 1. This vehicle consists of a frame 10 having front wheels 12 and 14, mounted thereon in any suitable manner, as on a front axle 16. The frame has a rearward inclined portion 18 forming a back rest for the driver, and rails 20, suitably elevated from the ground to a plane above tubular frame 10 so as to form guards. Welded to frame 10 is forwardly inclined U-frame 22 supporting steering column 24, which is inclined upwardly and rearwardly, and has a steering wheel 26 secured to its free end.

The other end of column 24 is connected to a tie rod 28 for turning the front wheels. A front tubular bumper 30 is secured to the front axle 16. An engine 32 is secured to the vehicle by means of bracket 44, which is secured to the rear axle housing 54 and frame member 49. Tubular members 34 and 36 are attached to rear axle housing 54 and back member 18 to provide a rear support.

The engine is preferably disposed in offset relation to the medial axis of the frame, but may be placed elsewhere, if desired. Suitably this engine may be of the air cooled type. Mounted above the engine is fuel tank 47. The crankshaft of the engine has a sprocket and centrifugal clutch keyed thereon, and is connected by means of an endless chain to a sprocket 48 adjacent one of the rear wheels. The vehicle is also equipped with starting means (not shown) which may be of the conventional recoil starter type commonly employed on air cooled motors.

Foot brake pedal 50 is mounted on the front end of the vehicle, and braking action is communicated to the rear wheels through brake rod 53 mounted along the tubular frame. The front end of the rod is secured to the lever of the brake pedal. The other end is fastened to a suitable lever (not shown) on brake shaft 57 which is mounted transversely of chassis 10 and having a lever extension 40 on which is mounted a removable tire engaging member 59.

It has been found that when smooth racing tires are employed, conventional flat tire engaging members are sometimes ineffective because stone, sand, etc., find their way between the tire and the tire engaging member, and thereby act as anti friction bearings in effect.

I have found that the tire engaging member 59 shown in FIGURE 3 very satisfactorily overcomes this deficiency. The tire engaging member 59 shown in FIGURES 1 and 3 is made from a standard die spring which is of such a length that when the washer 11 and the cap screw 13 are secured to the lever extension 40 it will be under compression between the washer and the right angle bend of the extension 40, thus preventing it from rotating.

It has been found that the spirals of the spring 59 provide a self cleaning action and no anti friction effect is encountered because of the sand particles mentioned above.

When conventional knobby tires are employed then the spring member 59 may be removed and replaced by a conventional smooth flat plate (not shown) which brakes against the tire being stopped, the treads of which then provide the self cleaning action.

The drive of the present invention is illustrated in detail on FIGURE 3. 54 is a tubular rear axle housing supported by frame members 49 and terminating in stationary bearing housing 61. As shown, sprocket 48 is fixedly connected to a sleeve 52 in any suitable manner such as by welding or by shrinking. Sleeve 52 is keyed on axle 54A by means of key 56, so that axle 54A may be rotated by the movement of sprocket 48 when the same is turned by motion transferred thereto from engine 32. Sleeve 52 has a cup-shaped end 58 abutting clutch housing 60, which has a flange 62 secured for rotation with another flange 64 on wheel bearing housing 66. Housings 66 and 60 are freely journaled on axle 54A, through ball bearings 63 and 65. Housing 60 and sleeve 52 are provided with aligned axial recesses within which is received helical right hand wound prehensile spring 68. This spring has an internal diameter larger than that of axle 54A, over which it is freely mounted. The spring may be of any effective clutching configuration, so that when it is not subjected to any stress, it has an internal diameter slightly larger than the internal diameter of the recesses. In operation all torque exerted on the spring originates from the motion of the axle or from motion of the wheel bearing housing. In turn the spring bears against the cylindrical walls of the recesses. When sprocket 48 is rotated, spring 68 expands to impart drive from housing 58 to housing 60, thereby imparting driving motion to the wheel. When it is necessary for the wheel to rotate faster than sprocket 48, the spring 68 contracts to allow forward slipping in either housing 58 or housing 60.

On the opposite end of axle 54A near the other rear wheel is mounted a similar arrangement as that above described with the exception that no sprocket is mounted on its sleeve unless the vehicle has a second engine mounted thereon, which would require such a sprocket. In this arrangement, a left hand wound prehensile spring, as opposed to the right hand wound spring, is also used to impart a driving motion to the wheel bearing housing and hence to the wheel.

In the embodiments above described, the overrunning clutches have been positioned on opposite ends of the axle rod. It will be appreciated however, that the present invention need not be restricted to that precise positioning of elements. For example, the two clutches may be instead mounted on split axles on either side of the sprocket 94.

For example, in the embodiment of the invention shown on FIGURE 4, clutches are provided in association with a jack shaft from which motion is transmitted to the rear wheels. FIGURE 4 is a rear view of this embodiment. This view is shown rotated to show more clearly the arrangement of the component parts, since the jack shaft assembly and the wheel shaft assembly do not lie on the same plane.

In FIGURE 4, the jack shaft assembly comprises a central sprocket 94 fixedly secured to sprocket sleeve 96 by suitable means such as welding or upsetting. An endless chain A connects sprocket 94 to engine drive sprocket B. The central part of sleeve 96 has a bearing 97 in which fit the abutting ends of jack shafts 114 and 115, in shaft housings 93 and 95. Sprocket sleeve 96 has two cup-shaped recesses 98 and 100 on either side of the sprocket 94. These recesses open away from the sprocket and communicate with oppositely facing recesses 102 and 104 in tubular sleeves 106 and 108 to form spring housings.

Two helical right hand and left hand wound springs 120 and 122 fit in recesses 98 and 102, and 100 and 104, respectively. The outer surfaces of the springs bear against the internal surfaces of the recesses when driving motion is imparted to the sprocket and transmit this motion to sleeves 106 and 108. Pins 117 secure sleeves 106 and 108 to their respective shafts 114 and 115.

Spacers 111 and 113 separate these sleeves 106 and 108 from bearings 120 and 121 in which the jack shafts 114 and 115 rotate. Brackets 123 and clamp rods 119 secure the two housings 93 and 95 together. The housings 93 and 95 are secured to the cart frame by suitable means (not shown) such as welding or bolting.

At the other end of each housing are positioned bearings 124 in which the jack shafts 114 and 115 rotate. Mounted on the jack shafts 114 and 115 are collars 118 and sprockets 128 fixedly secured on the jack shafts 114 and 115.

On a different plane on the cart chassis from the above assembly is positioned the rear axle assembly. This assembly comprises rear axle 130 in which is mounted wheel shaft 132. Brake drums 134 which are welded to sprockets 136 are freely journaled on the wheel shaft 132. Endless chains 138 connect sprockets 136 and 128. Suitable wheel clamps 140 secure the wheels to the rear axle sprockets by means of studs and bolts (not shown).

During normal operation of the above described version of the invention, driving motion imparted to central sprocket 94 is transferred by means of the helical springs to the jack shafts and the two sprockets thereon. Since these two sprockets are operatively connected to the wheel sprockets on the rear axle the latter will also be driven. When either of the rear wheels must rotate faster than the other; that is, faster than the speed at which it is turned, it will pull on its corresponding sprocket on the jack shaft causing the same to slip within its clutch housing. In turn, the clutch housing member keyed on the shaft will slip over the spring surface.

It will also be appreciated instead of employing a jack shaft drive as shown in FIGURE 4, it is also possible to mount the driven rear wheels directly upon the extremities of jack shafts 114 and 115 in place of sprockets 128.

It has been found desirable in some instances to employ jack shafts as shown in FIGURE 4, to provide not only a reduction from engine speed to wheels speed, but also to permit the easy use of internal expanding brakes instead of the scrubber brakes shown in FIGURES 1 and 3.

In the foregoing description the term carting is frequently written in the trade as karting but for consistency, I have spelled this as carting.

It will also be appreciated that while this invention has filled a need in the carting field, it can also be advantageously employed on a variety of vehicles, as for example, golf carts, lawn mowers, and similar vehicles.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

I claim:

In a vehicle having a light skeleton chassis, steering means on said chassis, an engine disposed in offset relation to the medial axis of said chassis, and having a crankshaft with a driven sprocket secured thereon, an axle rod, a pair of tubular sleeves keyed on said rod adjacent opposite ends thereof, said sleeves having axial circular recesses formed therein, one of said sleeves having a sprocket fixedly secured thereto and operatively connected to said engine, a pair of wheel bearing housings rotatably mounted on said axle rod, means on said housings defining axial circular recesses communicating with said recesses of said sleeves for the reception of helical prehensile springs therein, said springs being mounted about said rod and operatively connected with said sleeves, said housings being driven when the springs are rotated in a direction to expand the springs.

References Cited in the file of this patent
UNITED STATES PATENTS

| | | |
|---|---|---|
| 659,222 | Foster | Oct. 9, 1900 |
| 1,006,500 | Peterson | Oct. 24, 1911 |
| 1,013,848 | Steiger | Jan. 2, 1912 |
| 2,226,759 | Fitzner | Dec. 31, 1940 |
| 2,375,184 | Bernhard | May 8, 1945 |
| 2,420,100 | Salsbury | May 6, 1947 |
| 2,639,785 | Vickers | May 26, 1953 |
| 2,828,833 | Civello | Apr. 1, 1958 |
| 2,918,981 | Rupp | Dec. 29, 1959 |
| 2,927,480 | Schweickart | Mar. 8, 1960 |
| 3,008,558 | Bennett et al. | Nov. 14, 1961 |

FOREIGN PATENTS

| | | |
|---|---|---|
| 821,823 | Great Britain | Oct. 24, 1959 |